United States Patent Office 3,582,522
Patented June 1, 1971

---

3,582,522
STABILISERS FOR ORGANIC MATERIALS
Arthur Stanley Briggs, Norton-on-Tees, England, assignor to Imperial Chemical Industries Limited, London, England
No Drawing. Filed May 6, 1968, Ser. No. 727,073
Claims priority, application Great Britain, May 11, 1967, 21,879/67
Int. Cl. C08f 45/58
U.S. Cl. 260—45.85                                14 Claims

ABSTRACT OF THE DISCLOSURE

Borates of alkanes which are substituted by at least three hydroxyphenyl groups, or mixtures of such alkanes and boric oxide, boric acid or a borate ester, are valuable stabilisers for organic materials. Preferably they are used with diesters of thiodialkanoic acids, for example, di-lauryl thiodipropionate.

---

This invention relates to stabilisers for organic materials, especially olefine polymers and polyamides.

According to the invention, novel stabilisers comprise an alkane which is substituted by at least three hydroxyphenyl groups and boric oxide, a boric acid or an ester thereof; or a borate of the substituted alkane.

The new stabilisers have been found to be more effective in preventing the mechanical degradation of polyolefines at high temperatures than are the individual components.

Suitable substituted alkanes include those of formula:

$$ZCHX^1CHR^1R^2$$

in which Z is hydrogen, a phenyl of hydroxyphenyl group, an alkyl group or a group of formula $YCHX^2$ in which Y is hydrogen, a phenyl or hydroxyphenyl or alkyl group or a group of formula $X^3X^4HC(CH_2)_m$ in which $m$ is an integer having a value of 0 to 4, in which at least one of $X^1$, $X^2$, $X^3$ and $X^4$ represents a hydroxyphenyl group the remainder being hydrogen, and in which $R^1$ and $R^2$ represent hydroxyphenyl groups.

It is preferred that each hydroxyphenyl group should be substituted in an ortho position relative to the —OH group by an alkyl or cyclo-alkyl group having from 1 to 8 carbon atoms. It is preferred that this should be a tertiary group, for example a tert.butyl or a tert.octyl group. The hydroxyphenyl group is also preferably substituted by at least one further alkyl group, for example a methyl or tert.butyl group, in the other ortho or a meta position. Preferred hydroxyphenyl groups are 1-butoxy-3,6-dialkyl phenyl groups.

Examples of particularly suitable substituted alkanes have the formulae:

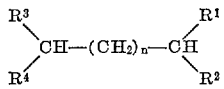

in which $n$ is an integer in the range 0 to 4, and is preferably 3, and $R^1$, $R^2$, $R^3$ and $R^4$ are hydroxyphenyl groups as aforesaid, or:

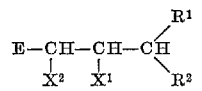

in which $R^1$, $R^2$, $X^1$ and $X^2$ are as previously described and E is a methyl or phenyl group or hydrogen. A material of the first type may be produced by condensing 3-methyl-6-tert.butyl phenol with glutaraldehyde $n$ being in this case 3 and $R^1$, $R^2$, $R^3$ and $R^4$ all being 1-hydroxy-3-methyl-6-tert.butyl phenyl groups, and a material of the second type may be produced by condensing 3-methyl-6-tert·butyl phenol with crotonaldehyde of aldol, E being in this case a methyl group and $X^1$ or $X^2$ being a 1-hydroxy-3-methyl-6-tert.butyl phenyl group.

Examples of suitable borate esters are those of formula:

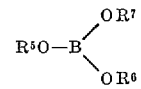

in which at least one of $R^5$, $R^6$ and $R^7$ are alkyl, cyclo-alkyl, phenyl or alkyl phenyl groups having at most 10 carbon atoms the others being hydrogen, for example tri-ethyl borate, tri-cresyl borate, diphenylmethyl borate, and tris-(4-methyl-2,6-di-tert.butylphenyl) borate.

Ortho-boric or pyro-boric acids may be used.

The boric oxide, acid or ester thereof is preferably present in a proportion of 0.25 to 100% and more preferably in a proportion of from 0.5 to 10% by weight (expressed as boron) of the weight of the substiuted alkane. In the case of the condensate of 3-methyl-6-tert.butyl phenol with crotonaldehyde or aldol referred to above, the stoichiometric ratio of boric acid gives a proportion of about 2% by weight (expressed as boron).

It has been found that a considerable improvement in the efficiency of the stabilisers of this invention may be obtained by incorporating in them di-esters of thio di-alkanoic acids of formula:

$$R^9OOCC_pH_{2p}SC_qH_{2q}COOR^8$$

in which $p$ and $q$ are integers in the range 1 to 6, and preferably 3 or 4, and $R^8$ and $R^9$ are aliphatic hydrocarbon groups having 6 to 20 and preferably 12 to 18 carbon atoms. These are suitably alkyl groups. Examples of such di-esters are dilauryl and distearyl thio dipropionates and lauryl stearyl thio dipropionate. An attractive feature of stabilisers according to this form of the invention is that polypropylene compositions containing them do not normally discolour during processing or on aging at high temperatures.

Di-esters of thio di-alkanoic acids are normally incorporated in a proportion of from one to five parts by weight per part by weight of the substituted alkane present.

The invention also comprises olefine polymer compositions (especially polypropylene and high density polyethylene compositions) stabilised with the above stabilisers, especially those comprising 0.05 to 0.5% by weight of the substituted alkane based on the polyolefine, 0.25 to 100% by weight boron in the form of boric oxide, boric acid or an ester thereof, based on the weight of the substituted alkane present, and preferably 0.05 to 0.5% by weight of a di-ester of a thio di-alkanoic acid based on the polyolefine.

EXAMPLE 1

A condensate of three molecules of 3-methyl-6-tert.butyl phenol with crotonaldehyde (0.5 gm.) dissolved in an inert solvent was mixed with polypropylene powder (100 gms.) and the inert solvent evaporated off. A second mixture was prepared in the same way but usng 0.5 gm. of a stoichiometric mixture of boric acid and the condensate of 3-methyl-6-tert.butyl phenol with crotonaldehyde (containing about 2% boron by weight as boric acid) instead of the condensate alone. This method of mixing produces a homogeneous mixture without subjecting the ingredients to excess heat.

Samples from both of the preparations were formed, by pressing for three minutes at 180° C., into sheets 0.8 mm. thick. These were then aged in a circulated air oven at 150° C. until embrittlement occurred.

It was found that embrittlement occurred after 103 hours in the case of the first sample and after 281 hours in the case of the second sample.

EXAMPLE 2

A stoichiometric mixture of boric acid and the condensate of 3-methyl-6-tert.butyl phenol with crotonaldehyde as above (0.1 gm.), and 0.25 gram of dilauryl thio dipropionate were mixed in a ball mill with unstabilised polypropylene powder (100 gms.) for 24 hours. This mixture was then milled for 10 minutes in a roll mill at 180° C. Plaques 20 thousandths of an inch thick were pressed at 270° C. for 5 minutes at slight pressure, 5 minutes at 5 tons per square inch pressure, 5 minutes at 12 tons per square inch pressure and 2 minutes at 20 tons per square inch pressure, following which they were cooled to 160° C. and then immersed in water to cool them to room temperature. Strips cut from the plaque were heated at 150° C. in a continuous slow stream of air until embrittlement occurred.

It was found that no discoloruration occurred until 4 weeks had elapsed and that the discolouration after 10 weeks was still slight. Embrittlement did not occur until 2540 hours had elapsed.

EXAMPLE 3

Samples of polypropylene containing 0.4% by weight of calcium stearate and the other ingredients shown in the table below were injection moulded at 250° C. The colour of the resulting moulded products is indicated in the last two columns.

| 1,1,5,5-tetrakis-(1-hydroxy-3-methyl-6-tert · butyl phenyl) pentane [1] | Dilauryl thiodi- propionate [1] | Boric acid [1] | Colour scale [2] | Description of colour |
|---|---|---|---|---|
| 0.5 | | | 5 | Light brown. |
| 0.5 | 0.1 | | 3 | Light buff. |
| 0.1 | 0.25 | | 2 | Very slight buff. |
| 0.1 | 0.25 | 0.1 | 1 | Colourless. |

[1] Percent by weight.
[2] An arbitrary scale, the number giving a linear indication of the depth of colour to visual inspection.

What is claimed is:

1. A stabilizer for organic materials which comprises a mixture of an alkane substituted by at least three hydroxy-phenyl groups with a boron compound selected from the group consisting of boric oxide, ortho-boric acid and pyro-boric acid.

2. A stabiliser as claimed in claim 1 in which the substituted alkane has a formula $ZCHX^1CHR^1R^2$ in which Z is hydrogen, a phenyl or hydroxy-phenyl group, an alkyl group or a group of formula $YCHX^2$ in which Y is hydrogen, a phenyl or hydroxy-phenyl gorup, an alkyl group or a group of formula $X^3X^4HC(CH_2)_m$ in which $m$ is an integer having a value of 0 to 4, at least one of $X^1$, $X^2$, $X^3$ and $X^4$ represents a hydroxyphenyl group the remainder being hydrogen, and $R^1$ and $R^2$ represent hydroxyphenyl groups.

3. A stabiliser as claimed in claim 2 in which each hydroxyphenyl group is substituted in an ortho position relative to its —OH group by an alkyl or cycloakyl group having from 1 to 8 carbon atoms.

4. A stabiliser as claimed in claim 3 in which the alkyl group is a tertiary group.

5. A stabiliser as claimed in claim 3 in which the hydroxyphenyl groups are 1-hydroxy-3,6-dialkylphenyl groups.

6. A stabiliser as claimed in claim 2 in which the substituted alkane has the formula $R^3R^4CH(CH_2)_mCHR^1R^2$ in which $m$ is an integer in the range 0 to 4 and $R^1$, $R^2$, $R^3$ and $R^4$ are hydroxyphenyl groups.

7. A stabiliser as clamed in claim 2 in which the substituted alkane has the formula $ECHX^2CHX^1CHR^1R^2$ in which E is a methyl or phenyl group or hydrogen.

8. A stabiliser as claimed in claim 7 in which the substituted alkane is the condensation product of three molecules of 3-methyl-6-tert.-butyl phenol with crotonaldehyde or aldol.

9. A stabiliser as claimed in claim 1 in which the boric oxide or boric acid is present in a proportion of 0.25 to 100% (expressed as boron) of the weight of the substituted alkane.

10. A stabiliser as claimed in claim 1 which comprises also a di-ester of a thio di-alkanoic acid of formula $$R^9OOCC_pH_{2p}SC_qH_{2q}COOR^8$$

in which $p$ and $q$ are integers in the range 1 to 6 and $R^8$ and $R^9$ are alkyl groups having 6 to 20 carbon atoms.

11. A stabiliser as claimed in claim 10 in which the di-ester is dilauryl or distearyl thio dipropionate.

12. A stabiliser as claimed in claim 10 in which the di-ester of the thio di-alkanoic acid is incorporated in a proportion of from 1 to 5 parts by weight per part by weight of the substituted alkane present.

13. A polypropylene or high density polyethylene composition comprising 0.05 to 0.5% by weight of an alkane which is substituted by at least three hydroxyphenyl groups based on the polypropylene or high density polyethylene and 0.25 to 100% by weight of boron in the form of a boron compound selected from the group consisting of boric oxide, ortho-boric acid and pyro-boric acid based on the weight of the substituted alkane present.

14. A composition as claimed in claim 13 which in addition comprises 0.05 to 0.5% by weight of a di-ester of a thio di-alkanoic acid of formula $$R^9OOCC_pH_{2p}SC_qH_{2q}COOR^8$$

in which $p$ and $q$ are integers in the range 1 to 6 and $R^8$ and $R^9$ are alkyl groups having 6 to 20 carbon atoms, based on the polyolefine.

References Cited

UNITED STATES PATENTS

| 3,131,164 | 4/1964 | Doyle | 260—45.7 |
| 3,196,185 | 7/1965 | Ranson | 260—45.95 |
| 3,396,186 | 8/1968 | Cyba | 260—462 |

DONALD E. CZAJA, Primary Examiner

V. P. HOKE, Assistant Examiner

U.S. Cl. X.R.

252—400, 404; 260—45.7, 45.95